April 22, 1952   P. V. McNAMARA ET AL   2,594,054
GARBAGE DISPOSAL APPARATUS
Filed Oct. 23, 1946
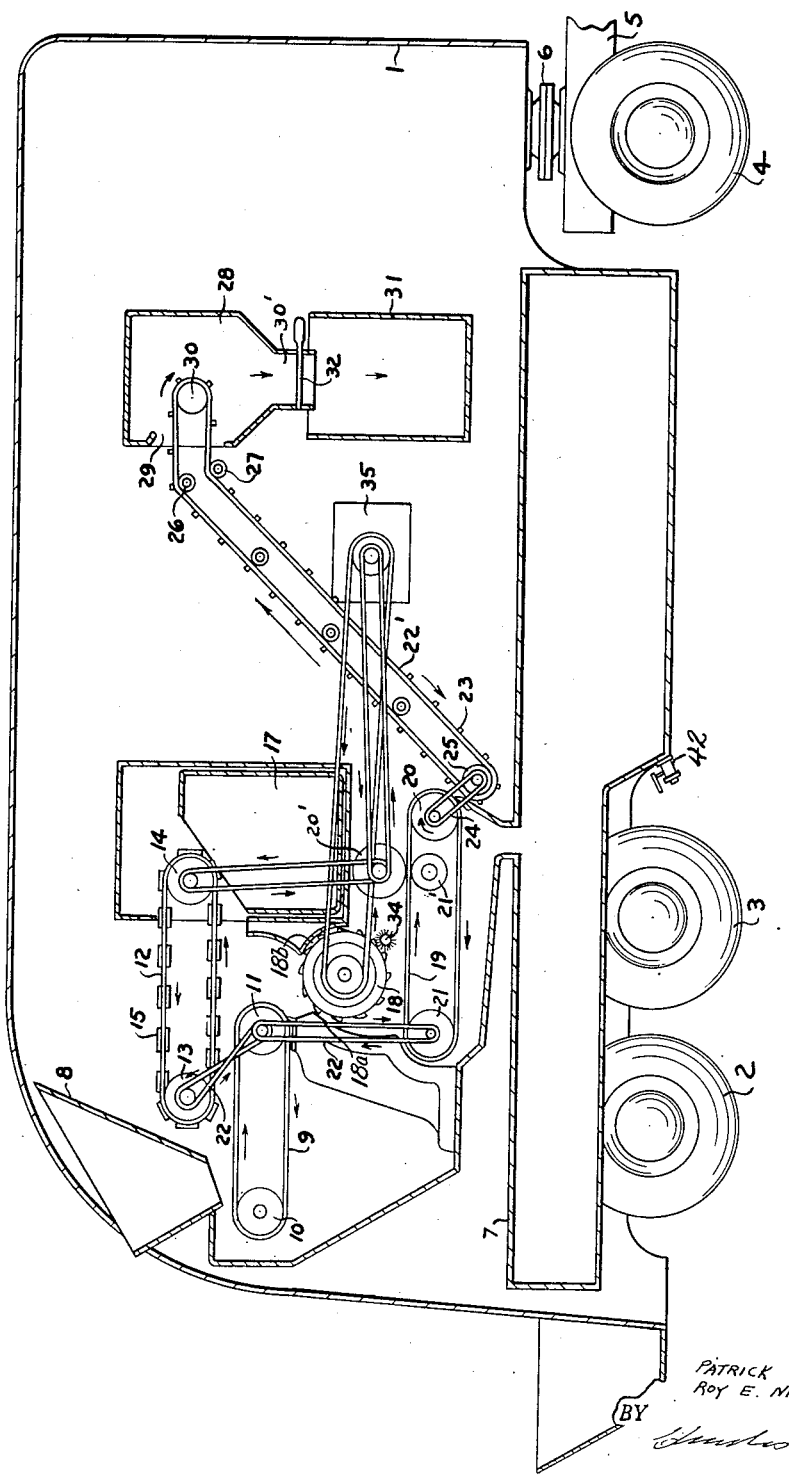
INVENTOR.
PATRICK V. McNAMARA.
ROY E. NICHOLSON.
BY
ATTORNEY Patented Apr. 22, 1952

2,594,054

UNITED STATES PATENT OFFICE 2,594,054

GARBAGE DISPOSAL APPARATUS

Patrick V. McNamara and Roy E. Nicholson, Detroit, Mich.

Application October 23, 1946, Serial No. 705,110

1 Claim. (Cl. 100—50)

This invention relates to garbage disposal apparatus the object being to provide a wheeled vehicle in the nature of a trailer and connected with a draft apparatus such as an automobile or other means.

Heretofore the garbage is picked up along a street and dumped into any convenient place which is objectionable due to stench arising from the decaying vegetable matter.

By our improved apparatus the garbage is dumped into the apparatus and is passed to disintegrating apparatus and any metal particles are separated from the garbage and disposed in a convenient container and the vegetable matter is disintegrated and passed to a separate container which may be used as feed for hogs or cattle.

The drawing is a longitudinal section of the apparatus.

In the preferred form of the apparatus the body 1 is supported by the wheels 2, 3 and 4 and the axles of the wheel 4 is connected to a tongue 5 and is connected to the body by a swivel 6. In the bottom of the body is a reservoir 7 and the material is picked up at successive points along the street and is dumped into a hopper 8 and falls by gravity onto a travelling belt 9 supported by pulleys 10 and 11, which is moved in the direction indicated by the arrow and above the belt 9 and in comparatively close association therewith is a belt 12 on the pulleys 13 and 14.

This belt 12 contains a series of magnets 15 and the material falling on the belt 9 passes beneath, and in close association with, the magnets and any metal particles are picked up by the magnets and carried around the pulleys. A portion of the top wall of hopper 17 is positioned adjacent the surface of the magnets to thereby remove the metal material therefrom which falls into said hopper 17. The garbage on the belt 9 falls onto the sharp toothed cylindrical grinding wheel 18 and, through rotation thereof relative to the grinder housing walls 18a and 18b is broken up and shredded into small particles and is dropped onto the belt 19 positioned on the pulleys 20 and 21. The pulley 21 is rotated by a belt 22 connected with the axle of the wheels 11 and 21 and the wheel 11 is connected with the wheel 13 by a crossed belt 22. Thus the lower flight of the belt is moved in the direction indicated by the arrow.

Any metal particles picked up by the magnets 15 on the belt 12 falls into the hopper 17. The vegetable material is discharged by the toothed grinding wheel 18 onto the belt 19 and is then passed between the live rubber roller 20' and the hard rubber roller 21' whereby it is crushed, wrung out and is discharged from the belt onto the conveyor 22'. Conveyor 22' is of belt like form which has transverse strips 23 thereon in spaced relation longitudinally thereof. This belt is driven by a belt 24 which passes over the shaft of the pulley 20 and shaft of the roller 25. The belt 22' is upwardly and forwardly inclined and, at the upper end, engages the rollers 26 and 27 and extends horizontally into a chambered member 28 through an aperture 29 in the side wall thereof and about the roller 30 within the chamber 28.

The toothed grinding wheel 18 is driven by a belt on the pulley on the shaft of the internal combustion motor 35. The wire brush 34 cleans the blades on the wheel 18.

The chamber 28 has a spout 30' opening to a removable container 31 and a slide valve 32 is operable to prevent flow of material into the container. When the valve 32 is closed the container 31 may be removed and the material therein disposed of in any approved manner. By using the material as food for animals or for fertilizer the said material is not wasted as has been the case heretofore. The liquid in the reservoir 7 may be discharged therefrom by means of the valve 42.

As shown in the drawing the apparatus is connectable with a draft apparatus by the member 5. However the apparatus may be otherwise propelled if desired.

Having thus briefly described our invention, its utility and mode of operation, what we claim and desire to secure by Letters Patent of the United States is:

In a garbage disposal apparatus, a chambered body, a hopper to receive the garbage positioned within said body, a longitudinally movable belt upon which the garbage is dropped from said hopper, a second longitudinally movable belt above and adjacent the first belt in parallel relation therewith, a series of magnets spaced upon said second belt by means of which any iron particles in the garbage may be removed therefrom, a container into which one end of said second belt cooperatively extends and into which the removed metal particles fall, the top wall of said container being so formed adjacent said magnet carrying belt as to scrape off accumulated particles therefrom, a chambered member below and at the end of said first belt for receiving said garbage, a toothed grinding wheel within said chambered member and cooperable with the interior walls thereof for shredding said garbage, a longitudinally movable belt within the lower portion of said chambered member on which the shredded material is discharged, an upwardly inclined conveyor with its lower end adjacent and below the end of said last named belt and arranged upon the exterior of said chambered member, a second elevated chambered member into which the upper end of said conveyor extends and having a bottom discharge opening, a removable container below said discharge opening into which the processed material is discharged, a pair of crushing and wringing rolls adjacent the top and bottom surfaces of the movable belt within the lower portion of said chambered member, and a tank in said body and in communication with the lower end of said first chambered member for receiving the liquid material expressed from the garbage.

PATRICK V. McNAMARA.
ROY E. NICHOLSON.

REFERENCES CITED

The following references are of record in the file of this patent:

UNITED STATES PATENTS

| Number | Name | Date |
| --- | --- | --- |
| 603,945 | Edgerton | May 10, 1898 |
| 825,470 | Lane | July 10, 1906 |
| 1,122,847 | Blain et al. | Dec. 29, 1914 |
| 1,259,248 | Lammertz | Mar. 12, 1918 |
| 1,325,602 | Albright | Dec. 23, 1919 |
| 2,002,993 | Ehrick et al. | May 28, 1935 |
| 2,291,042 | Kennedy | July 28, 1942 |